June 12, 1956  J. M. BRICAUD  2,750,557
ELECTRICAL LOGGING OF SUBTERRANEAN FORMATIONS
Filed June 4, 1954  2 Sheets-Sheet 1

INVENTOR.
JOSEPH M. BRICAUD
BY William R. Sherman
HIS ATTORNEY

INVENTOR.
JOSEPH M. BRICAUD
BY William P. Sherman
HIS ATTORNEY

United States Patent Office 2,750,557
Patented June 12, 1956

2,750,557

ELECTRICAL LOGGING OF SUBTERRANEAN FORMATIONS

Joseph M. Bricaud, Houston, Tex., assignor to Schlumberger Well Surveying Corporation, Houston, Tex., a corporation of Delaware Application June 4, 1954, Serial No. 434,580

9 Claims. (Cl. 324—10)

The present invention relates to electrical logging of subterranean formations traversed by a borehole and more particularly to new and improved electrode apparatus of special utility in connection with methods and apparatus for making highly localized measurements of the electrical resistivity of the material lying near to the side wall of a borehole drilled into the earth.

In copending application Serial No. 214,273, filed March 7, 1951, by H. G. Doll for "Electrical Logging of Earth Formations Traversed by a Borehole," now Patent No. 2,712,629, very effective methods and apparatus are disclosed whereby highly localized electrical resistivity measurements may be made on the wall of a borehole which are more truly indicative of the resistivities of invaded zones lying behind mud cake formed on permeable formations. Electrode arrays used in connection with said methods and apparatus may include an insulating cushion member adapted to be pressed against the wall of a borehole, in the face of which are embedded a central electrode and one or more additional electrodes spaced thereabout.

An object of the present invention is to provide new and improved electrode arrays useful in accordance with the methods and apparatus disclosed in the above-mentioned copending application.

Another object of the invention is to provide new and improved electrode arrays as above, which are affected by a substantial volume of formation material under investigation extending to the desired depth so as to enhance repeatability and reliability of measurements obtained.

These and other objects of the invention are attained by embedding a central electrode of substantially an elliptical configuration in the face of the cushion member and surrounding this electrode with one or more similarly embedded additional electrodes substantially of elliptical configuration confocal with the central electrode. Such configuration of the one or more additional electrodes will not appreciably distort the equipotential surfaces for current flowing through the central electrode. As a result, the electrodes will be less prone to adverse polarization effects. Furthermore, with such configuration the electrodes may be carried on a cushion member of relatively small width while remaining responsive to a substantial volume of the formation material extending to the desired effective depth beyond the borehole wall. It will be appreciated that the larger the volume to which the electrodes respond, the more repeatable and hence reliable will be the measurements obtained.

The invention and others of its objects and advantages will be better perceived from the following detailed description of several typical embodiments thereof, taken in conjunction with the accompanying drawings, in which.

A brief exposition of electric field theory for electrodes of elliptical configuration will be helpful to an understanding of this invention, though not intended in any way to limit its scope. In the idealized instance of a finite linear electrode disposed in a homogeneous medium and passing current through such medium to an infinitely remote point, the equipotential surfaces about such electrode will be prolate ellipsoids confocal with such linear electrode when its end points are considered to be its foci. This may be established readily by Laplace's equation. If the linear electrode were replaced by an ellipsoidal electrode having the same foci, such ellipsoidal electrode would have the selfsame ellipsoidal equipotential surfaces under these same idealized conditions. If the electrode is then disposed with its foci in an infinitely extending surface which is the boundary between a non-conducting medium and a conducting medium, the equipotential surfaces will be undisturbed in the conducting medium.

Where the ellipsoidal electrode is replaced by a planar, elliptical electrode lying in this bounding surface and the bounding surface terminates a finite short distance from the electrode, the equipotential surfaces will be distorted slightly in the immediate region in front of such elliptical electrode but will remain substantially unchanged laterally of such electrode for this short distance. Again if the elliptical electrode is replaced by electrode segments all at the same potential and having an elliptical locus, the equipotential surfaces will be distorted but slightly, especially at distances from such electrode which exceed the order of the dimensional departures of such electrode from a true planar ellipse. Accordingly, a variety of electrode configurations approximating an ellipse will yield equipotential surfaces therearound having substantially the same ellipsoidal configuration that would be obtained with a true ellipsoidal electrode. As a correlative, current passed to a remote point from both an elliptical electrode and a surrounding coplanar, confocal elliptical electrode will yield elliptical lines of equal potential in the plane of such electrodes and lying therebetween, which lines are confocal with the electrodes.

Figure 1:
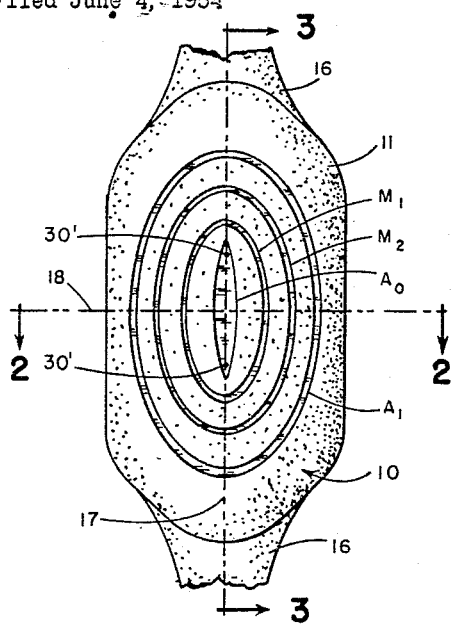
Fig. 1 is a front elevational view of a cushion member carrying electrodes arranged in accordance with this invention.

With these principles in mind, a cushion 10 is shown in Fig. 1 having embedded or inlaid in its outer face 11 a plurality of electrodes $A_0$, $M_1$, $M_2$ and $A_1$ having a configuration substantially of confocal ellipses. Such cushion member 10 is arranged to be pressed intimately into engagement with a borehole wall 12 to exclude drilling fluid 13 by a support such as is disclosed in aforementioned Patent No. 2,712,629 and including a bowed spring 16.

The cushion member 10 is faced with a suitable flexible insulating material such as rubber, for example, which allows its face 11 to conform with the wall 12 of the borehole despite variations in the wall diameter. By suitable reinforcements or otherwise, the cushion member 10 is further made considerably more susceptible to flexure about its longitudinal axis, indicated at 17, than about its transverse axis, indicated at 18, and its face 11 preferably will have a cylindrical contour about the axis 17 with a radius of curvature in an unstressed position equal, for example, to the average of the borehole radii normally encountered, on the order of 4 inches. Thus, the cushion member 10 will be relatively rigid and straight in the longitudinal direction, although the resiliency of its face 11 may accommodate localized irregularities. This resiliency of its face 11 may, for example, be enhanced by an hydraulic-type construction as disclosed in copending application Serial No. 295,996, filed June 27, 1952, by Blanchard and Mennecier for "Electrode Carrier Means for Well Logging Apparatus," which is assigned to the assignee of this application. The conformity of the cushion member 10 to the cylindrical curvature of the borehole wall is illustrated particularly in Fig. 2, while its conformity to the straight longitudinal line of the wall is illustrated particularly in Fig. 3.

With the application of sufficient pressure on the bowed spring 16, this construction of the cushion member 10 results in squeezing out the borehole fluid 13 from between the face 11 of the cushion and the wall 12, so that the shunting effect of any remaining film of fluid between the electrodes will have a negligible influence upon the resistivity measurements.

Figure 2:
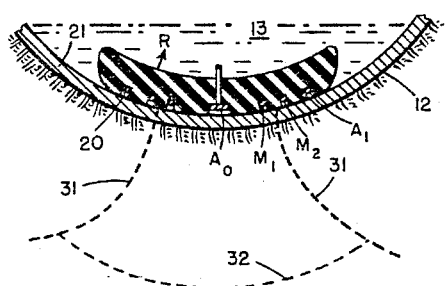
Fig. 2 is a sectional view taken along the line 2—2 of Fig. 1 and illustrating the seating of the cushion member in conformity with the borehole wall by a sectional view taken through a formation at the level of the line 2—2 in Fig. 1.

A central current electrode $A_0$, an auxiliary current electrode $A_1$, and monitoring electrodes $M_1$ and $M_2$ are embedded in the face 11 of the cushion member to an exposed depth slightly below its cylindrical contour so as to be out of rubbing contact with the borehole wall. At the same time, because the electrodes are slightly relieved from the contour of the face 11, there will be a space above each such electrode, as at 20 in Fig. 2, between the electrode and the borehole wall (or more specifically as shown in Fig. 2, between the electrode $M_2$ and a mud cake 21 formed on the borehole wall 12) which space 20 will be filled with the relatively conducting drilling fluid 13 contained within the borehole. This conducting fluid 13 places the electrodes in electrical communication with the mud cake 21 or the borehole 22, as the case may be, yet the interposition of the sealing outer face 11 of the cushion member between the electrodes prevents the drilling fluid 23 from effectively short circuiting these electrodes. Connection of the electrodes $A_0$, $M_1$, $M_2$ and $A_1$ into a suitable measuring circuit, such as any of those disclosed in above-mentioned Patent No. 2,712,629, may be effected by conductors 25, 26, 27 and 28, respectively, passing through the cushion member 10.

Considering now the specific construction of the electrodes, it will be seen in Fig. 1 that electrode $A_0$ has the form of a plate with its outer periphery an ellipse having foci 30' arranged along a line parallel to the axis 17 and preferably disposed centrally of the generally elliptical outline of the face 11. In outward order from the electrode $A_0$, the spaced electrodes $M_1$, $M_2$ and $A_1$ have an elliptical configuration substantially confocal with the electrode $A_0$. It will be apparent, however, that the conformity of the electrodes $M_1$, $M_2$ and $A_1$ to the cylindrical contour of the face 11 of the cushion member removes their configuration from the precise geometrical definition of a planar ellipse. If, however, the minor axis of the electrode $A_1$ is on the order of 4 inches, which is a practical dimension, the departure of the electrodes $M_1$, $M_2$ and $A_1$ from a true elliptical configuration will not appreciably affect the advantages flowing from their approximation to this configuration. Moreover, as they are preferably disposed at the intersection of the cylindrical face 11 and the equipotential surfaces for the electrode $A_0$, their configuration is preferably not that of an exact ellipse but rather that of the line of such intersection.

Figure 4:
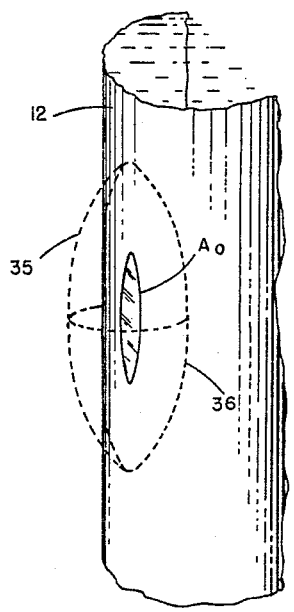
Fig. 4 is a diagrammatic representation illustrative of a representative equipotential surface which results from the passage of survey current from an elliptical central electrode applied to the wall of a borehole by means of the cushion member.

This line of intersection will have the form of a "saddle back" curve, as seen in Fig. 4, which may be approximated in a practical manner by embedding elliptical electrodes in the face 11 while it is planar and then bending both the face 11 and the embedded electrodes into the desired cylindrical contour. As a consequence of this close approximation, the electrodes $M_1$ and $M_2$ in particular may be considered to extend along the lines of equal potential for the electrode $A_0$.

Where the minor axis of the electrode $A_1$ is taken to be 4 inches, its major axis may, for example, be 7 inches in length, a ratio of over 1.5 to 1. For these same dimensions, the face 11 of the cushion member 10 might, for practical purposes, have a transverse dimension of 5 inches and a longitudinal dimension of 8 inches so as to provide a band approximately ½ inch in width about the electrode $A_1$ for sealing it against intrusion of a film of drilling fluid. As a transverse dimension of 5 inches for the face 11 is on the order of the maximum permissible width of the cushion face for seating on a borehole wall with a radius of curvature of 4 inches, the elliptical configuration of electrodes allows a greater spacing for such electrodes along the vertical axis than along the horizontal axis. This result is obtained without appreciably increasing the depth of effective response of the electrodes beyond that obtaining with the shorter spacings along both axes, because the depth is governed predominantly by the spacings in the horizontal plane (which are unchanged) due to the greater tendency of the survey current to diverge in this plane in following the transverse borehole contour.

Figure 3:
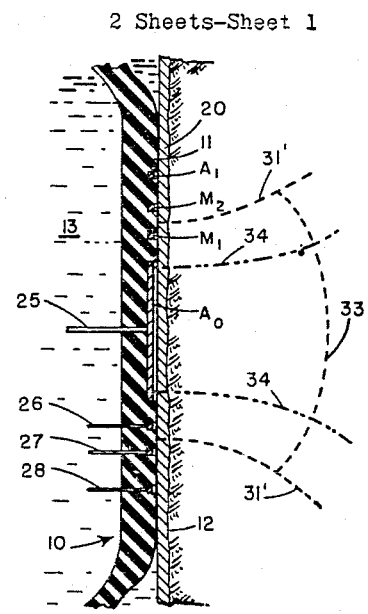
Fig. 3 is a sectional view taken along the line 3—3 of Fig. 1 and illustrating the seating of the cushion member along the length of the borehole wall by a section through formations taken on the line 3—3 of Fig. 1.

In Figs. 2 and 3, the enlargement of the volume of the adjacent media affecting a resistivity measurement is graphically depicted by a comparison of the horizontal and the vertical cross sections through the media lying under the face of the cushion member. For the sake of such comparison, this volume may be approximated as though it were defined by the zero potential gradient surface intersecting the face 11 on a closed line confocal with and approximately midway between the electrodes $M_1$ and $M_2$. Accordingly, the bounds of the affecting volume are indicated by dashed lines 31 in Fig. 2 and dashed lines 31' in Fig. 3. Dashed lines 32 and 33 in these figures may be taken as defining an equipotential surface at the desired maximum depth of the resistivity investigation. The effect of the elongation in the vertical plane is made evident for comparison by the dot-dot-dashed lines 34 in Fig. 3 drawn with the same initial spacing as the lines 31 of Fig. 2. Thus, the present invention permits a substantial volume of the media to affect resisitivity measurements at any given level without altering the desired depth of investigation or increasing the width of the cushion member beyond its practical limits.

It will be apparent that localized anomalies in the media traversed by the cushion member will have less an effect upon the survey current from the central electrode in proportion to the volume of the media significantly affecting this current. Accordingly, the cushion member 10 of the present invention enhances the repeatability of measurements taken on successive runs past the same formations and thereby improves the reliability of the measurements.

Fig. 4 provides a graphic representation of a line 36 of intersection between a representative equipotential surface 35 for the electrode $A_0$ and the cylindrical contour of the borehole wall 22 to which the face of the cushion member 10 conforms. As the equipotential surface 35 within the formations has the idealized form of an ellipsoid confocal with the electrode $A_0$, it will be observed that its line 36 of intersection is substantially an ellipse confocal with the elliptical periphery of the electrode $A_0$. As the line 36 of intersection is an equipotential line, it will be appreciated that the disposition of electrodes $M_1$, $M_2$ and $A_1$ upon similar lines of intersection will leave the ellipsoidal equipotential surfaces undistorted. Consequently, the significance of the measurements obtained is more readily susceptible to mathematical analysis based upon the elliptical geometry of the equipotential surfaces.

Figure 5:
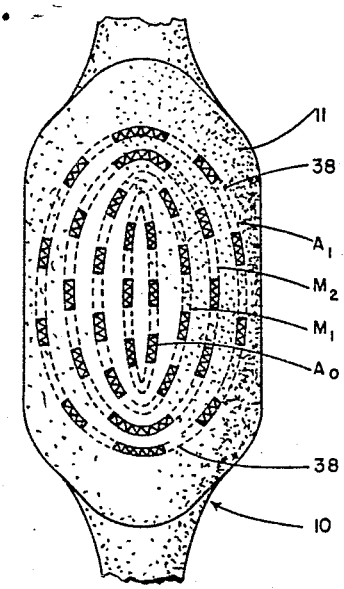
Fig. 5 illustrates an embodiment of the invention in which the electrodes are in coil form for enhanced flexibility and are exposed in segments along substantially confocal ellipses.

While the continuous exposed surfaces provided by the electrodes $A_0$, $M_1$, $M_2$ and $A_1$ of Fig. 1 represent an ideal, the practical problem of retaining such electrodes embedded in the face 11 of the cushion member and conforming to its flexures requires a rugged connection between the electrodes and the cushion member. This is achieved in Fig. 5 by the provision of bridged portions 38 of the cushion face 11 which overlie the electrodes at spaced points along their length. Flexibility of the electrodes is obtained by constructing them as helical coils of a material such as Nichrome wire of a diameter, for example, such as $\frac{1}{16}$ inch.

Figure 6:
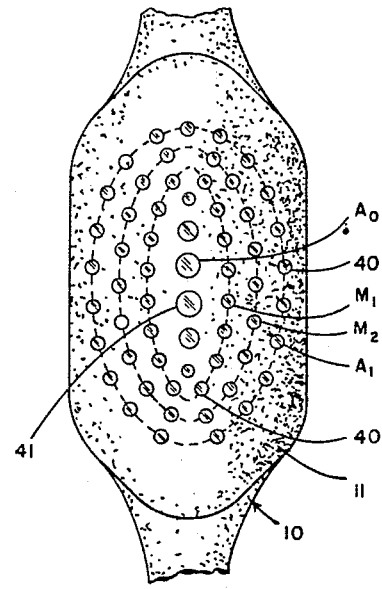
Fig. 6 is a front elevational view of a cushion member having electrodes comprising a series of suitably arranged button-like segments.
Figure 7:
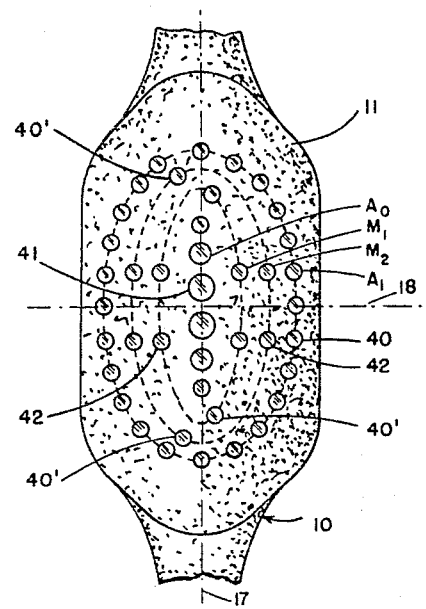
Fig. 7 is similar to Fig. 6 with reduced numbers of button-like segments for the monitoring electrodes.

Fig. 6 illustrates the arangement of the electrodes as button-like segments 40, the loci of which are confocal ellipses about the electrode $A_0$. The electrode $A_0$ is itself composed of button-like segments 41 of varying sizes such that a closed line tangent to each of them, which may be referred to as an envelope, will be a confocal ellipse similar to the periphery of the electrode $A_0$ in Fig. 1. As may be seen in Fig. 7, the segments 40 for the electrodes $M_1$ and $M_2$ have diminished to groups 42 of four each localized about the minor axis 18 on either side of electrode $A_0$ and single segments 40' grouped about the major axis 17.

Figure 8:
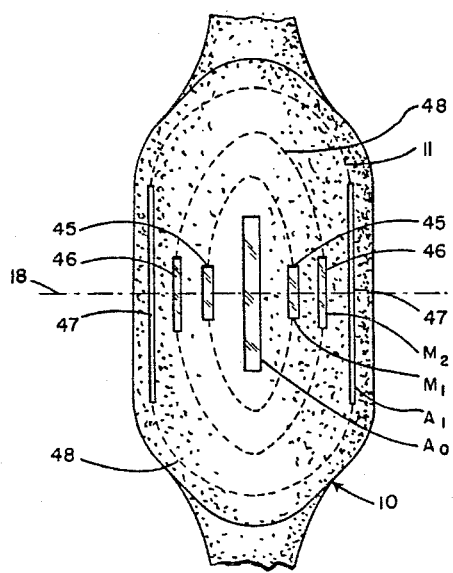
Fig. 8 is a front elevational view of another embodiment employing linear electrodes disposed to approximately confocal elliptical electrodes.

Remembering that the principal axis of flexure for the cushion member 10 is parallel to the major axis of the electrodes, the linear configuration of the electrodes in Fig. 8 will be seen to offer yet a greater flexibility in this mode. Here the electrode $A_0$ has a linear configuration which approximates an ellipse of an infinite degree of ellipticity. Accordingly, the equipotential surfaces for the electrode $A_0$ in Fig. 8 will again be substantially in the form of ellipsoids confocal with the electrode $A_0$. Because the ellipticity is so great, however, the line of intersection between these equipotential ellipsoidal surfaces and the cylindrical contour of the cushion face 11 will be substantially straight lines on either side of the electrode $A_0$ near the horizontal axis 18. Advantage is taken of this linearity by having the electrodes $M_1$, $M_2$ and $A_1$ composed of linear segments 45, 46 and 47, respectively, symmetrically disposed in parallel relation on either side of the electrode $A_0$. In order to achieve a close approximation to confocal ellipses, the electrode segments 45, 46 and 47 will be of increasing length in that order, the order of their spacing from electrode $A_0$, with segments 47 extending above and below the electrode $A_0$ a short distance. Dashed lines 48 indicate approximately the continuations of the equipotential lines for the electrode $A_0$ which pass through the electrodes $M_1$, $M_2$ and $A_1$. With reference again to the above-mentioned Patent No. 2,712,629, it will be appreciated that the increased length of the outermost segments 47 aids in focusing in the vertical plane (in the manner represented in Fig. 3 of the present drawings by the dashed lines 31'). A further improvement is realized with the electrode construction of Fig. 8 in that distortions of the natural equipotential surfaces attributable to current from the electrode $A_0$, and hence polarization, are more apt to occur in the vicinity of the major axis where the spacing between the confocal ellipses is extremely small. By not continuing the electrodes at their tops and bottoms across the major axis, such a source of polarization is avoided.

From the foregoing, it will be apparent that the invention provides a novel and highly effective apparatus for obtaining localized indications of electrical resistivity on the wall of a borehole, which are substantially unaffected by the low resistivity of the drilling fluid. The various embodiments of the cushion member are particularly useful in conjunction with the logging apparatus disclosed in above-mentioned Patent No. 2,712,629 but may also find utility in related logging systems, such as two-electrode and three-electrode systems for making resistivity measurements against a borehole wall.

If desired, the electrodes $A_0$, $M_1$, $M_2$ and $A_1$ in Fig. 1 may be embedded more deeply in the face 11 of the cushion member so as to lie in a plane with the minor axis of the electrode $A_1$. Where the electrodes in Fig. 8 are shown to be continuous, they may instead have a bridged construction as in Fig. 5 or a button-type segmental construction as in Figs. 6 and 7, with the result that a greater degree of flexibility about the minor axis is achieved.

Accordingly, these and other modifications lying within the true scope and spirit of the invention are intended to be embraced within the ambit of the appended claims.

I claim:

1. Well logging apparatus comprising a flexible insulating cushion member having an outer face conformable to the wall of a borehole, a first electrode of a generally elliptical configuration embedded in said outer face, and a second electrode embedded in said outer face on either side of said first electrode and disposed generally along the line of intersection between said outer face and a generally ellipsoidal equipotential surface confocal with said first electrode, said electrodes being exposed for conducting current into the wall of a borehole and with said outer face being elongated to extend longitudinally of a borehole.

2. Well logging apparatus comprising a flexible insulating cushion member having an outer face of generally cylindrical contour for bearing on the wall of a borehole, a first electrode of generally elliptical configuration embedded in said outer face with its major axis generally parallel to the axis of said cylindrical outer face, and a second electrode embedded in said outer face on either side of said first electrode and disposed generally along the line of intersection between said outer face and a generally ellipsoidal equipotential surface confocal with said first electrode, said electrodes being exposed for conducting current into the wall of a borehole.

3. Well logging apparatus comprising a flexible insulating cushion member having an outer face of generally cylindrical contour for bearing on the wall of a borehole, a first electrode having an elliptical periphery embedded in said outer face with its major axis generally parallel to the axis of said cylindrical outer face, and a second electrode of ellipsoidal configuration confocal with the periphery of said first electrode and embedded in said outer face, said electrodes being exposed for conducting current into the wall of a borehole.

4. Well logging apparatus comprising a flexible insulating cushion member having an outer face of generally cylindrical contour with an elliptical periphery mounted for resiliently bearing against the wall of a borehole, a current electrode having an elliptical periphery and inlaid in said outer face with its major axis generally parallel to the axis of said cylindrical outer face and disposed centrally of said outer face, and a plurality of additional electrodes of elliptical configuration confocal with the periphery of said current electrode inlaid in said outer periphery and having different minor axes, the outermost of said additional electrodes being spaced from the periphery of said outer face to leave a margin for sealing out well drilling fluids.

5. Well logging apparatus comprising a flexible insulating cushion member having an elongated outer face conformable to the wall of a borehole, a linear electrode embedded in said outer face and disposed for alignment generally with the axis of such borehole, and a second electrically continuous electrode comprising linear segments embedded symmetrically on either side of said linear electrode in said outer face, said electrodes being exposed for conducting current into the wall of a borehole.

6. Well logging apparatus comprising a flexible insulating cushion member having an outer face of generally cylindrical contour for bearing on the wall of a borehole, a linear electrode inlaid in said outer face with its major axis generally parallel to the axis of said cylindrical outer face, and a plurality of additional electrodes, each comprising linear segments inlaid in said outer face on either side of said linear electrode and spaced symmetrically in parallel relation thereto, said linear segments having lengths increasing in proportion to their remoteness from said linear electrode.

7. Well logging apparatus comprising a flexible insulating cushion member having an outer face of generally cylindrical contour for bearing on the wall of a borehole with a major axis for alignment with the axis of said borehole, a first electrode inlaid in said outer face and consisting of aligned button-like segments of graduated diameter having an envelope in the form generally of an ellipse with its foci on said major axis, and a second electrode inlaid in said outer face and consisting of button-like segments the locus of which is an ellipse confocal with the envelope of said first electrode, said segments of said second electrode being localized in groups about said major axis and an axis transverse thereto.

8. Well logging apparatus comprising a flexible insulating cushion member having an outer face of generally cylindrical contour for bearing on the wall of a borehole, a main current electrode of generally elliptical configuration inlaid in said outer face with its major axis generally parallel to the axis of said cylindrical outer face, an auxiliary current electrode of elliptical configuration confocal with said main current electrode inlaid in said outer face, and a pair of spaced apart monitoring electrodes inlaid in said outer face between said main and said auxiliary current electrodes, each of said monitoring electrodes extending along an equipotential line for said current electrodes conforming generally to the surface of ellipsoids confocal with said main current electrode.

9. Well logging apparatus comprising an insulating cushion member having an outer face of generally cylindrical contour for bearing on the wall of a borehole with its axis aligned with the axis of the borehole, a first electrode inlaid in said outer face and comprising aligned button-like segments having an envelope approximating an ellipse of high ellipticity with its major axis parallel to the axis of said contour, a second electrode inlaid in said outer face and comprising button-like segments the locus of which is an ellipse confocal with the envelope of said first electrode to encircle the same, and third and fourth electrodes differently spaced intermediate said first and second electrodes, said third and fourth electrodes comprising segments which are localized in groups aligned with said major axis and in groups aligned parallel to the minor axis.

References Cited in the file of this patent
UNITED STATES PATENTS
2,669,690　　Doll ------------------ Feb. 16, 1954